Oct. 13, 1936.  G. W. DOUGLAS ET AL  2,057,372
KINGPIN
Filed May 7, 1935
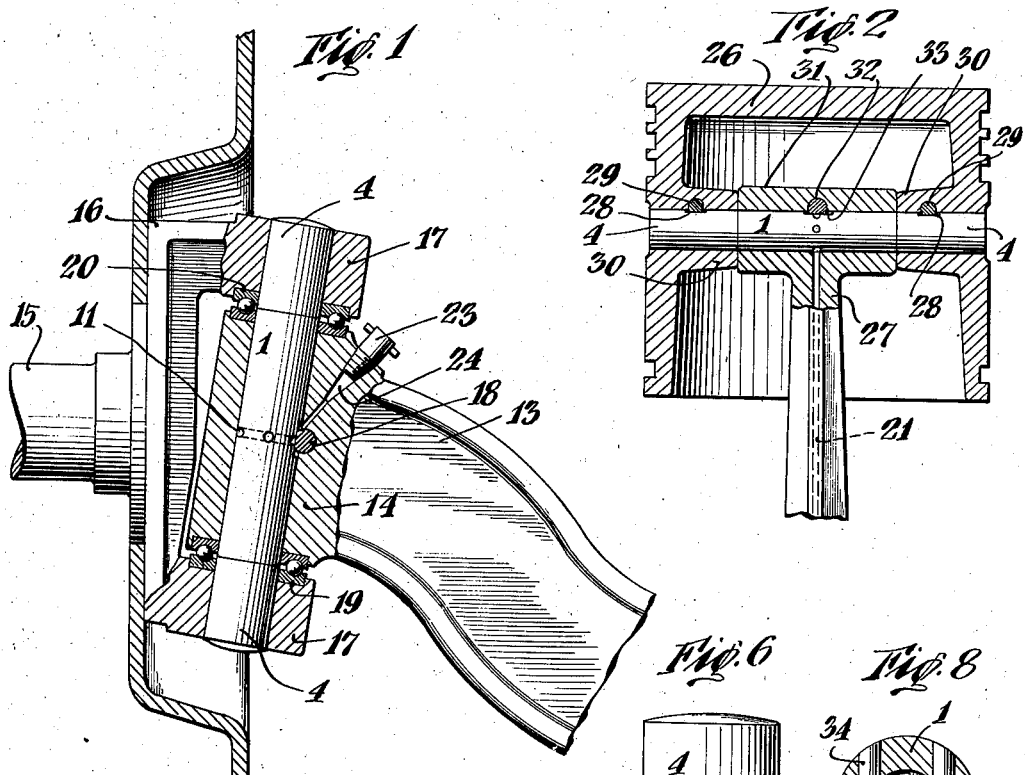
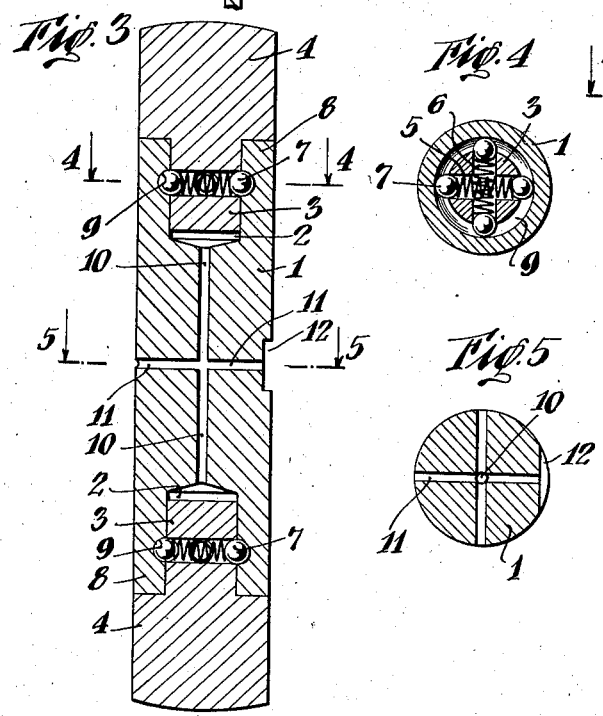
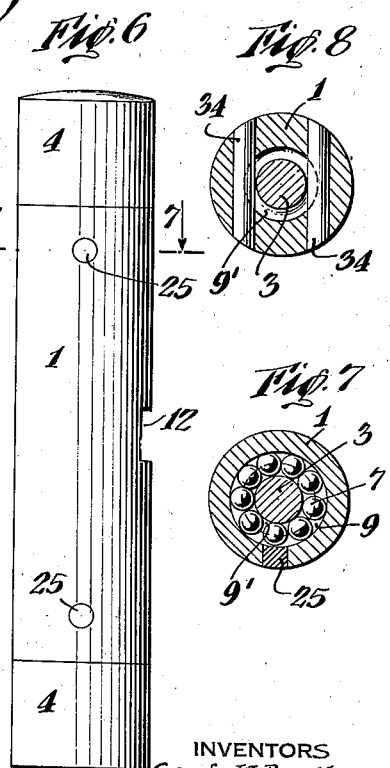
INVENTORS
George W. Douglas
BY John Joseph Dewey
Hoquet, Meary & Campbell
ATTORNEYS Patented Oct. 13, 1936

2,057,372

UNITED STATES PATENT OFFICE 2,057,372

KINGPIN

George W. Douglas, New York, N. Y., and John Joseph Dewey, Greenwich, Conn.

Application May 7, 1935, Serial No. 20,136

5 Claims. (Cl. 308—37)

This invention relates in general to king pins composed of separate parts so assembled as to permit relative rotation between the anchored part and those parts not anchored.

One of the most common uses of a king pin is in connection with the steering axle of an automotive vehicle. The steering axle usually carries a hollow boss fitting between two hollow bosses of a steering spindle yoke. The king pin is then passed through the three hollow bosses to removably join the axle to the spindle assembly. This king pin however is usually a rigid one-piece member and it is anchored to the axle boss. It is necessary to provide for rotative movement of the steering spindle boss relative to the axle boss as well as the connecting king pin. In accomplishing this it has previously been found necessary to provide a complicated bushing and roller or ball bearing assemblies as well as locking devices in the bosses to receive the king pin in rotative relationship with respect to its mounting. Not only is this arrangement of multiple separate parts complex and expensive in construction but unhandy in assembly and replacement. Moreover the proper assembly of the proper bushings calls for expert skill of workmanship.

Likewise, in the use of a king pin as a wrist pin, where the two ends of the assembly are fixed in the piston and the connecting rod is rotatable, much the same type of arrangement of bushings is employed with the accompanying disadvantages.

It is therefore an object of this invention to provide a self-contained and self-aligning articulated king pin unit, the use of which will eliminate the necessity for bushings and the like in order to properly install the king pin.

A further object is to provide such a king pin unit that will be adaptable for use as a connecting pin and permit relative movement regardless of which of the component parts of the king pin unit is anchored and which are free to rotate with respect thereto.

To these and other ends, it is proposed to construct an articulated king pin in the form of a unitary construction including a relatively long mid portion with two end portions that are rotatable relative to each other and to the mid portion. The king pin is usually cylindrical and the end portions and its mid portion have their surfaces flush with each other. When the king pin is used in a vehicle axle assembly it is press fitted so that the mid portion is anchored directly to the axle boss leaving the two end portions free to rotate with the spindle yoke bosses; and when the king pin is used as a wrist pin, it is also press fitted so that the end portions of the king pin are anchored to the piston, while the engine connecting rod may be fixedly connected to the mid portion to rotate therewith. These two uses are merely examples of the uses to which such a unitary king pin construction may be put without the necessity of bushings.

The essentials of the invention will become more apparent upon a reading of the following specification and appended claims, certain embodiments being illustrated in the accompanying drawing, in which:

Fig. 1 is a view in vertical section taken through the steering knuckle of a vehicle wheel showing the spindle and a portion of the axle in side elevation.

Fig. 2 is a view in vertical section taken through an engine piston, wrist pin and connecting rod.

Fig. 3 is a view in vertical section taken through a king pin.

Fig. 4 is a view in cross section taken along lines 4—4 of Fig. 3.

Fig. 5 is a view in cross section taken along lines 5—5 of Fig. 3.

Fig. 6 is a view in elevation of the king pin.

Fig. 7 is a view in cross section taken along lines 7—7 of Fig. 6.

Fig. 8 is a view in cross section similar to Fig. 7 of a modified form using pins instead of ball bearings.

Referring more particularly to the drawing, the king pin may comprise a cylindrical center portion 1 counter-bored at 2 to receive the reduced portions 3 of the two end portions 4. The outer surfaces of the center portion and end portions are preferably flush with each other.

In Figs. 3 and 4, we have shown a means of assembly of the unitary king pin. In this construction the reduced portions 3 may each be provided with radially extending holes 5 in which are arranged compression springs 6 bearing radially outwardly on suitable ball bearings 7. The cylindrical tongues 8 of the center portion are provided with a circular groove 9. Thus, in assembling the king pin the end portions may be forced into engagement with the center portion and when the ball bearings become aligned with the circular groove 9 the springs 6 force the balls outwardly so as to engage the groove 9. This forms an adequate ball bearing construction between the end portions and the center portion and likewise provides a means for locking the end portions to the center portion.

The center portion may also be provided with centrally located and vertically extending oil grooves 10 for the purpose of lubrication of the bearings. These oil grooves may also communicate with laterally extending oil grooves 11 for lubrication purposes. The center portion is also provided with a slot 12 to receive a key for anchoring the center portion.

In Fig. 1 there is represented a conventional wheel axle 13. This axle terminates in a hollow boss 14. The usual wheel spindle, as shown at 15, carries a yoke 16 which terminates in upper and lower bosses 17. Suitable thrust bearings 19 and 20 are provided between the bosses 14 and 17. In the position shown in Fig. 1, when the two hollow bosses are brought into alignment with the boss 14, the unitary king pin may be press fitted so as to extend through the three bosses. The king pin being a unitary construction, and no bushings being used, the axle assembly is self aligned by the king pin when it is press fitted into position in the three bosses. This does away with the necessity of expert skill in wheel axle assembly that would be necessary when other types of king pins employing bushings are used. A key, such as shown at 18, may then be brought into engagement with the keyway 12 to lock the center portion against rotative movement or, in other words, the center portion may be anchored to the axle boss. When the king pin is thus disposed the center portion is anchored but the two end portions are free to rotate with respect to the axle boss and the center portion of the king pin. Free swivel movement is further aided by means of the ball bearing assemblies above described. These ball bearing assemblies at the same time form locking means against longitudinal displacements of the king pin end portions with respect to the center portion. A grease plug is shown at 23 with corresponding grooves 24 for communication with grooves 10 and 11 for lubrication purposes. However inasmuch as the king pin is press fitted in the bosses, there is no danger of leakage past the end portions of lubricant that might otherwise reach the brake bands.

As a modification of the ball bearing assembly there is shown in Figs. 6 and 7, an arrangement in which the center portion may be bored in such a manner that the end portions may first be brought into their proper relationship with the center portion and the balls subsequently passed inwardly through the bore into the groove 9 so as to encircle the reduced portions of the end portions and engage a complementary peripheral groove 9' therein. When these balls have assumed their position, as shown in Fig. 7, the bore may be suitably plugged by means of a plug 25. The balls in engaging the two complementary grooves, locks the end portions to the center portion. This construction does away with the necessity of providing such resilient elements as shown in Figs. 3 and 4. The same result is obtained, namely, that there is provided an adequate means of locking the end portions against longitudinal displacement with respect to the center portion. At the same time there is provided an adequate ball bearing arrangement to take care of the relative movement between the end portions and the center portion of the king pin. Either one of these types of constructions are perfectly adaptable for use in connection with the arrangement disclosed and described in connection with Fig. 1.

Fig. 8 shows another modification of the pin in which the end portions may be bored to receive two pins 34 extending through in overlapping relationship to groove 9' to hold the two adjacent portions of the king pin together and provide a bearing for relative rotation therebetween.

While we have illustrated and described a particular use of the king pin, namely, that of providing a suitable connection between the wheel axle and the spindle assembly of a vehicle, it will be appreciated that the use of the king pin involved is not in any way limited to such a use. Neither is the invention limited to an arrangement in which the center portion is anchored, leaving the end portions free to rotate with respect thereto. On the contrary, the king pin constructed in accordance with our invention is also equally applicable for use in connection with devices wherein it is desired to anchor either one or both of the end portions, leaving the center portion free to rotate with respect thereto.

As an illustration of the adaptability of the present invention for the latter type of use, there is shown in Fig. 2 an engine piston 26 and a connecting rod 27. Here the king pin, whether it is of the type shown in Figs. 3 and 4 or that type shown in Figs. 6 and 7, or that shown in Fig. 8, may be used to replace the conventional wrist pin. The king pin is press fitted into the piston bosses 30 and the connecting rod collar 31. This not only does away with bushings, but prevents travel of oil out to the outside of the piston between the end portions and the piston bosses. Oil may be fed to the oil grooves 10 and 11 by means of the bore 21 in the connecting rod. The two end portions 4 may be provided with keyways 28 to receive keys 29 carried by the piston bosses 30 so as to lock the end portions against rotative or longitudinal movement with respect to the piston. The connecting rod may carry an integral collar 31 which is provided with a key 32 adapted to engage a keyway 33 formed in the center portion 1 of the king pin. This locks the center portion of the king pin against longitudinal or rotational displacement with respect to the connecting rod collar. However, the conventional engine crank in its rotational movement gives a combined rotative and reciprocal motion to the connecting rod. The king pin forms an adequate wrist pin in view of the fact that the center portion keyed to the connecting rod is free to rotate with respect to the anchored end portions.

It will be appreciated that these actual uses of the king pin are merely exemplary of the uses to which the king pin may be put wherein it is desired to anchor either one or both of the end portions of the king pin, leaving the center portion to rotate freely with respect thereto.

It will be seen by the foregoing description that we have provided a self-aligning king pin unit, which is simple in construction and assembly by the use of which it is possible to eliminate the conventional bushings and locking devices common to that type of construction calling for a connecting bolt, for a wide variety of purposes. It will also be appreciated that the particular type of king pin disclosed may be varied as long as it comprises an articulated bolt in which the center portion and the two end portions may be rapidly assembled and locked against longitudinal displacement and at the same time permitting free relative rotation between the component parts.

We claim:

1. A unitary self-contained articulated bolt having a center portion and two end portions, said end portions being relatively rotatable with respect to said center portion, and means disposed interiorly of said bolt to lock said portions together against longitudinal displacement and constitute a bearing for relative rotational movement of said portions.

2. A unitary self-contained articulated bolt having a center portion and two end portions, said end portions being relatively rotatable with respect to said center portion, bearing means for permitting relative rotational movement of said portions, said means consisting of relatively rotatable bearing members mounted interiorly of said bolt and between the adjacent bearing surfaces of the mid portion and the end portions.

3. A unitary self-contained articulated bolt having a center portion and two end portions, said end portions being relatively rotatable with respect to said center portion, and relatively rotatable bearing members mounted interiorly of said bolt and between the adjacent bearing surfaces of the mid portion and the end portions for locking said center portion and end portions together against longitudinal displacement.

4. A unitary self-contained articulated bolt having a center portion and two end portions, said end portions being relatively rotatable with respect to said center portion, said center portion and end portions being provided with interfitting tongues, said tongues having complementary aligned interiorly arranged annular grooves, relatively rotatable bearing members resiliently urged into said grooves for locking said center portion and end portions together against longitudinal displacement whereby said end portions may be manually brought into locked engagement with said center portion.

5. A unitary self-contained articulated bolt having a center portion and two end portions, said end portions being relatively rotatable with respect to said center portion, said center portion and end portions being provided with interfitting tongues, said tongues having complementary aligned interiorly arranged annular grooves, relatively rotatable bearing members resiliently urged into said grooves for locking said center portion and end portions together against longitudinal displacement whereby said end portions may be manually brought into locked engagement with said center portion, and means for anchoring one of said portions against rotative movement.

GEORGE W. DOUGLAS.
JOHN JOSEPH DEWEY.